J. Breeden,
Globe Valve.
No. 101,977.      Patented Apr. 19, 1870.
FIG I
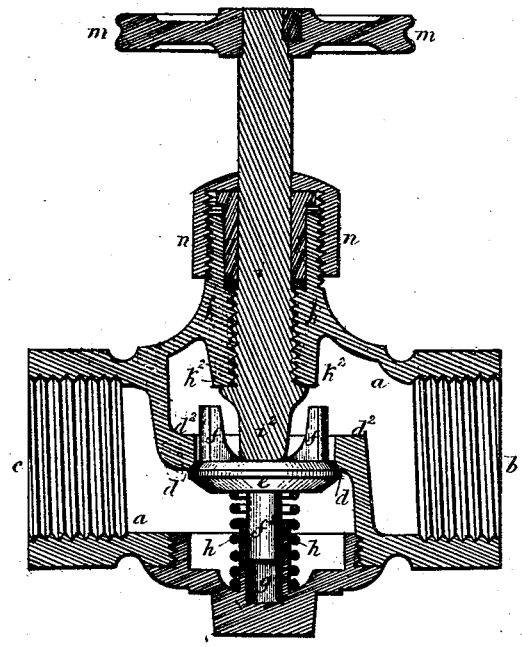
FIG II
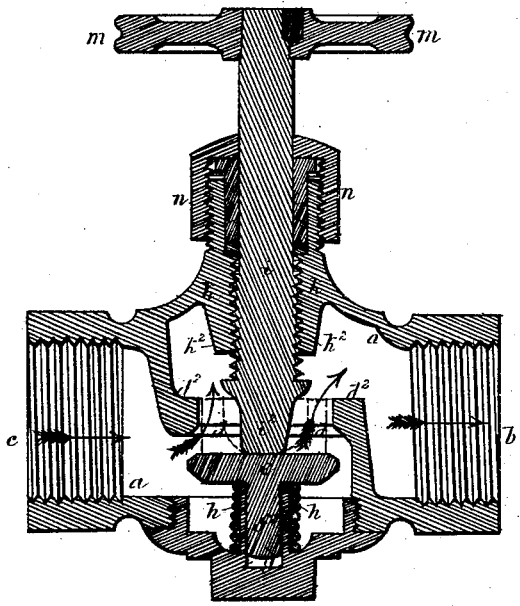
The Drawing referred to in the accompanying Specification.
Joseph Breeden
Witnesses to the signature of Joseph Breeden
George Shaw
Richard Skerrett
N. PETERS, PHOTO-LITHOGRAPHER, WASHINGTON, D.C.

United States Patent Office.

JOSEPH BREEDEN, OF BIRMINGHAM, ENGLAND.

Letters Patent No. 101,977, dated April 19, 1870; patented in England December 21, 1868.

IMPROVEMENT IN STOP-COCKS FOR STEAM AND LIQUIDS.

The Schedule referred to in these Letters Patent and making part of the same.

*To all to whom it may concern:*

Be it known that I, JOSEPH BREEDEN, of the firm of J. & W. Breeden & Booth, of Birmingham, in the county of Warwick, England, manufacturers, a subject of the Queen of Great Britain, have invented or discovered new and useful "Improvements in Taps or Valves for Liquids, Gases, and Vapors;" and I, the said JOSEPH BREEDEN, do hereby declare the nature of the said invention, and in what manner the same is to be performed, to be particularly described and ascertained in and by the following statement thereof, that is to say:

My invention consists in constructing and arranging the parts of taps or valves essentially in the following manner:

The body of the tap or valve consists of a chamber in which a conical valve-seat, having its greatest diameter downward, is formed.

The lower division of the said body of the tap communicates with the ingress-pipe and the upper division with the egress-pipe.

Working on the valve-seat is a conical valve, opening downward. The spindle of the conical valve works in a tube on the bottom of the lower division of the body of the tap, and a coiled spring on the spindle raises the said valve and keeps it to its bearing on the conical seat described. The pressure of the liquid steam or gas also tends to raise the valve and press it onto its seat.

In the top or body of the tap is an opening from which a tube depends. The said tube is screwed within, and a screw-rod, with a hand-wheel or other handle at its top, rises and falls by a rotary motion in the said tube.

When the handle is so turned as to depress the rod, its lower end presses upon and depresses the valve, and a communication is thereby opened between the ingress and egress-pipes.

By reversing the motion of the handle, the valve no longer pressed from its seat, is raised thereto by the spring, and the communication between the ingress and egress-pipes is closed.

The motion of the screwed rod and valve downward is limited by the spindle of the valve, and the motion of the said rod upward is limited by its enlarged lower end coming against the lower edge of the screwed tube.

The valve is guided in its motion by three or other number of upright guides, situated near its periphery, working in a short tube surmounting the valve-seat.

Having explained the nature of my invention, I will proceed to describe, with reference to the accompanying drawings, the manner in which the same is to be performed.

Figures 1 and 2 represent vertical sections of a tap or valve, constructed according to my invention, suited for regulating the passage of steam, and also adapted to regulate the passage of hot and cold water, fig. 1 representing the tap closed, and fig. 2, the tap open.

The same letters of reference indicate the same parts in both figures.

$a$ is the body of the tap, and $b$ $c$ are the egress and ingress-pipes, opening respectively into the upper and lower parts of the said body, as represented.

$d$ is the internal conical valve-seat, situated between the upper and lower divisions of the body $a$.

$e$ is a solid conical valve, opening downward.

$f^2$ is the lower spindle of the valve, which works in the tube $g$ at the bottom of the body $a$.

The part $g$ is screwed to the bottom of the body in the manner represented.

By means of the coiled spring $h$ around the exterior of the pipe $g$, the valve $e$ is kept to its bearing on the conical seat $d$, the pressure of the liquid bearing on the under side of the said valve also tending to raise it and press it to its seat.

$i$ is a rod having a screw on its exterior, which works in a hollow screw in the tubular part or barrel $k$ of the tap.

The upper part of the rod $i$ works through a stuffing-box, $l$, and the said rod is turned by a handle, $m$, (or hand-wheel,) at top.

The top of the barrel $k$ is closed, and the stuffing-box $l$ held in its place by the screw-cap $n$.

The bottom $i^2$ of the rod $i$ is solid, and bears against the flat upper face of the valve.

The valve $e$ is guided in its motion partly by the spindle $f^2$, and, in addition, it is provided, on its upper face, with three or more upright guides, $f$, situated near its periphery, and working in the tube, at $d^2$, above the valve-seat $d$.

The conical valve, thus constructed and guided, is especially adapted to regulate the passage of steam, although, as above stated, it may also be used for regulating the passage of liquids.

When the handle $m$ is turned so as to depress the screwed rod $i$, the lower part $i^2$ presses upon and depresses the valve $e$ from its seat $d$, as represented in fig. 2, and opens the tap, the liquid passing from the ingress pipe $c$, through the valve-seat $d$, to the egress-pipe $b$, as indicated by the arrows.

As the valve $e$ descends, its motion is limited by the spindle $f^2$ coming against the bottom of the tube $g$, in which it works.

By reversing the motion of the handle $m$, the bottom tubular end $i^2$ of the rod $i$ is withdrawn from the valve $e$, when the said valve is raised to its seat $d$ by the spring $h$, assisted by the pressure of the liquid, as represented in fig. 1, when the tap is closed.

The upward motion of the screwed rod $i$ is limited by the enlarged lower end coming against the bottom $k^2$ of the tube or barrel $k$.

Having described my invention,

What I claim, and desire to secure by Letters Patent, is—

The combination and arrangement of the spindled valve $e\ f\ f^2$, constructed as described, with the valve-seat $d\ d^2$, screw-rod $i\ i^2$, tube $g$, and coiled spring $h$, substantially as and for the purposes shown and set forth.

JOSEPH BREEDEN. [L. S.]

Witnesses:
GEORGE SHAW,
RICHARD SKERRETT,
} 7 Cannon street, Birmingham.